(12) United States Patent
Murphy et al.

(10) Patent No.: US 9,212,623 B2
(45) Date of Patent: Dec. 15, 2015

(54) HEAT EXCHANGER ARRANGEMENT FOR TURBINE ENGINE

(75) Inventors: Michael Joseph Murphy, Vernon, CT (US); Sean P. Zamora, Coventry, CT (US)

(73) Assignee: United Technologies Corporation, Hartford, CT (US)

(*) Notice: Subject to any disclaimer, the term of this patent is extended or adjusted under 35 U.S.C. 154(b) by 2483 days.

(21) Appl. No.: 11/964,058

(22) Filed: Dec. 26, 2007

(65) Prior Publication Data

US 2009/0169359 A1   Jul. 2, 2009

(51) Int. Cl.

| F01D 25/08 | (2006.01) |
| F02K 1/46 | (2006.01) |
| F01D 25/12 | (2006.01) |
| F01D 25/14 | (2006.01) |
| F02K 1/82 | (2006.01) |
| F04D 29/58 | (2006.01) |

(52) U.S. Cl.
CPC . *F02K 1/46* (2013.01); *F01D 25/12* (2013.01); *F01D 25/145* (2013.01); *F02K 1/822* (2013.01); *F04D 29/5826* (2013.01); *F05D 2220/34* (2013.01); *F05D 2220/50* (2013.01); *F05D 2260/208* (2013.01); *Y02T 50/672* (2013.01); *Y02T 50/675* (2013.01)

(58) Field of Classification Search
CPC ......... F02K 1/46; F01D 25/12; F01D 25/145; F04D 29/5826

USPC ............... 415/177, 178, 179; 60/226.1, 226.3
See application file for complete search history.

(56) References Cited

U.S. PATENT DOCUMENTS

| 2,853,854 | A | * | 9/1958 | Avery et al. | 60/39.83 |
| 4,203,286 | A | | 5/1980 | Warburton | |
| 4,254,618 | A | * | 3/1981 | Elovic | 60/226.1 |
| 4,849,895 | A | * | 7/1989 | Kervistin | 701/100 |
| 5,157,917 | A | | 10/1992 | Liang | |
| 5,267,608 | A | | 12/1993 | Coffinberry | |
| 5,269,135 | A | | 12/1993 | Vermejan | |
| 5,577,381 | A | | 11/1996 | Eigenbrode | |
| 5,755,093 | A | | 5/1998 | Palusis | |
| 6,106,229 | A | | 8/2000 | Nikkanen | |
| 6,301,877 | B1 | | 10/2001 | Liang | |
| 6,584,778 | B1 | * | 7/2003 | Griffiths et al. | 60/782 |
| 6,931,834 | B2 | * | 8/2005 | Jones | 60/226.1 |
| 6,990,797 | B2 | | 1/2006 | Venkataramani | |
| 7,213,391 | B2 | | 5/2007 | Jones | |
| 7,607,308 | B2 | * | 10/2009 | Kraft et al. | 60/785 |
| 7,810,312 | B2 | * | 10/2010 | Stretton et al. | 60/266 |
| 2005/0047942 | A1 | * | 3/2005 | Grffin et al. | 417/423.1 |

* cited by examiner

*Primary Examiner* — Edward Look
(74) *Attorney, Agent, or Firm* — Carlson, Gaskey & Olds, P.C.

(57) ABSTRACT

A turbine engine cooling arrangement includes a core passage for receiving a core flow for combustion, a first airflow source including a first passage adjacent the core passage for conveying a first airflow, and a second airflow source including a second passage adjacent the first passage for conveying a second airflow. A heat exchanger is thermally connected with the first passage and the second passage for transferring heat between the first airflow and the second airflow.

8 Claims, 2 Drawing Sheets

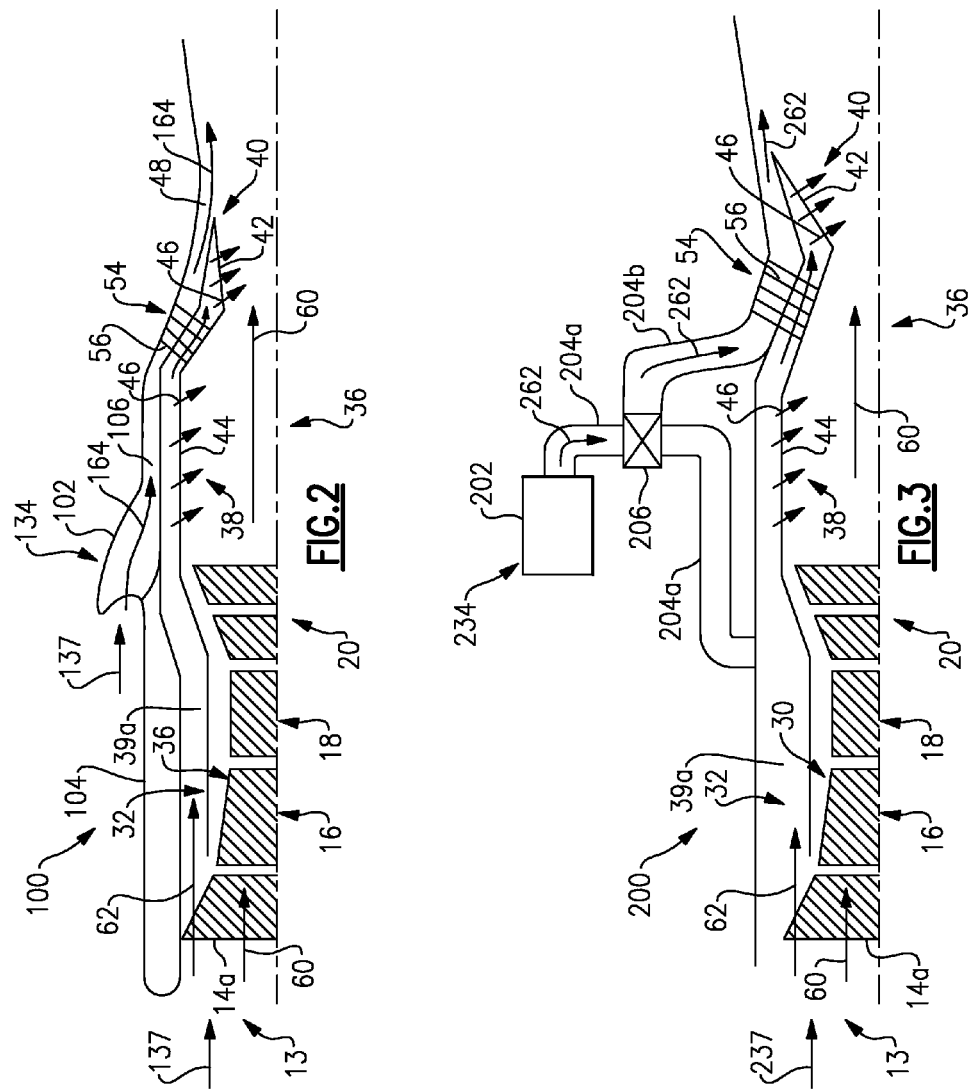

US 9,212,623 B2

HEAT EXCHANGER ARRANGEMENT FOR TURBINE ENGINE

BACKGROUND OF THE INVENTION

This disclosure relates to cooling arrangements and, more particularly, to an air-to-air cooling arrangement for a gas turbine engine.

Gas turbine engines are known and used for propulsion in vehicles, such as an aircraft. For example, a typical gas turbine engine includes a combustion section for combusting fuel and air to generate hot combustion gases. The combustion gases expand in a turbine section to provide rotational power that is used to propel the vehicle. The combustion gases are then discharged from of the engine through an exhaust nozzle.

Typically, the combustion is designed to occur in a particular temperature range to maximize the efficiency of the engine. However, the temperature at surfaces of engine components may be limited by the materials that are used to construct the engine. For example, the surface temperature in the combustor, turbine section, and exhaust nozzle cannot exceed the operating temperatures of the materials used to construct these components, although the temperature in the gas path of the combination gases may exceed this.

Accordingly, there is a need for a cooling method and arrangement that maintains the exhaust nozzle at a desirable temperature.

SUMMARY OF THE INVENTION

An example turbine engine cooling arrangement includes a core passage for receiving a core flow for combustion, a first airflow source including a first passage adjacent the core passage for conveying a first airflow, and a second airflow source including a second passage adjacent the first passage for conveying a second airflow. A heat exchanger is thermally connected with the first passage and the second passage for transferring heat between the first airflow and the second airflow.

In one example, a turbine engine includes a core passage having a combustion section and a turbine section for receiving a core flow for combustion. An engine inlet section divides inlet air into a first bypass flow and a second bypass flow. A first bypass passage is located radially outwards of the core passage for receiving the first bypass flow. A second bypass passage is located radially outwards of the first bypass passage for receiving the second bypass flow, and the heat exchanger is thermally connected with the first bypass passage and the second bypass passage for transferring heat therebetween.

An example method of providing cooling for use in a turbine engine includes the steps of establishing a core flow for combustion, a first airflow, and a second airflow. The first airflow includes a first temperature and a first pressure and the second airflow includes a second temperature that is lower than the first temperature and a second pressure that is lower than the first pressure. Heat is transferred from the first airflow to the second airflow to cool the first airflow. In one example, the cooled first airflow is used to maintain a desired temperature of an exhaust section of the turbine engine.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

FIG. 2 illustrates an example heat pipe for use in the gas turbine engine.

FIG. 3 illustrates another example heat pipe for use in the gas turbine engine.

DETAILED DESCRIPTION OF THE PREFERRED EMBODIMENT

Figure 1:
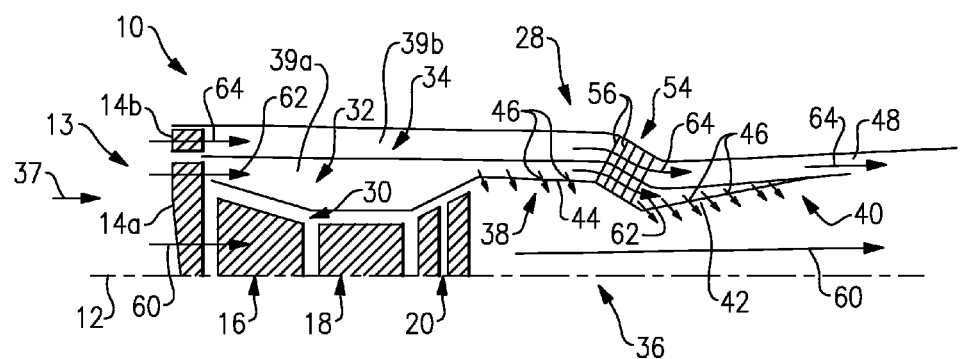
FIG. 1 illustrates selected portions of an example gas turbine engine.

FIG. 1 illustrates selected portions of an example gas turbine engine 10, such as a gas turbine engine 10 used for propulsion. The gas turbine engine 10 is circumferentially disposed about an engine centerline 12. In this example, the engine 10 includes an inlet section 13 having a first fan 14a and a second fan 14b. A compressor section 16, a combustion section 18, and a turbine section 20 are located downstream from the inlet section 13.

The fan 14b is decoupled from the fan 14a, as disclosed for example in copending application Ser. No. 11/977,874 filed Oct. 26, 2007, now U.S. Pat. No. 8,028,513 issued on Oct. 4, 2011. For example, the fan 14b is mounted to an outer shroud (not shown) outboard of the fan 14a to enable the fans 14a and 14b to rotate at different speeds. In this example, the fan 14a is coupled in a known manner with the turbine section 20, such as through a low spool shaft of the engine 10. An electric drive may be used to drive the fan 14b at a different speed than the fan 14a. In other examples, the engine 10 may be modified from the illustrated example, depending on the type of engine and its intended use.

As is known, air compressed in the compressor section 16 is mixed with fuel that is burned in the combustion section 18 to produce hot combustion stream that is expanded in the turbine section 20 to drive the fans 14a and 14b. FIG. 1 is a somewhat schematic presentation for illustrative purposes only and is not a limitation on the disclosed examples.

The example engine 10 includes a cooling arrangement 28 having a core passage 30, a first airflow source 32, and a second airflow source 34 that receive inlet air 37 that enters the engine 10. In this example, the first airflow source includes a first bypass passage 39a, and the second airflow source 34 includes a second bypass passage 39b. The inlet section 13 divides the inlet air 37 between the core passage 30, the first bypass passage 39a, and the second bypass passage 39b. The compressor section 16, the combustion section 18, and the turbine section 20 are included at least partially within the core passage 30. In the disclosed example, the first bypass passage 39a is located radially outwards of the core passage 30 relative to the engine centerline 12, and the second bypass passage 39b is located radially outwards of the first bypass passage 39a relative to the engine centerline 12.

The core passage 30, the first bypass passage 39a, and the second bypass passage 39b each terminate at an engine exhaust section 36, such as an exhaust nozzle. In this example, the engine exhaust section 36 includes a convergent section 38 and a divergent section 40 for discharging an exhaust flow from the core passage 30.

The first bypass passage 39a includes a first outlet 42 located at the divergent section 40 and another outlet 44 located axially forward of the divergent section 40 at the convergent section 38. Each of the outlets 42 and 44 of the first bypass passage 39a may include a plurality of film cooling slots 46 that provide a fluid connection between the first bypass passage 39a and the core passage 30.

The second bypass passage 39b also includes an outlet 48 that is located at the divergent section 40 of the engine exhaust section 36 and that is axially aft of the outlets 42 and 44 of the first bypass passage 39a. It is to be understood that relative positional terms such as "forward," "aft," "upper," "lower," "above," "below," and the like are with reference to the normal operational attitude of the vehicle and should not be considered otherwise limiting.

The cooling arrangement 28 also includes a heat exchanger 54 that is thermally connected with the first bypass passage 39a and the second bypass passage 39b. In this example, the heat exchanger 54 includes a plurality of heat pipes 56 each having one end that is at least partially within the first bypass passage 39a and another end that is at least partially within the second bypass passage 39b. Alternatively, other types of heat exchangers may be used. Given this description, one of ordinary skill in the art will recognize suitable types of heat exchangers to meet their particular needs.

In operation, the engine 10 receives inlet air 37 into the inlet section 13. The inlet section 13 divides the inlet air into a core flow 60, a first airflow 62, and a second airflow 64. The core flow 60 flows through the core passage 30, the first airflow 62 flows through the first bypass passage 39a, and the second airflow 64 flows through the second bypass passage 39b. The core flow 60 is utilized for combustion within the combustion section 18.

The engine 10 utilizes the first airflow 62 and the second airflow 64 for cooling the engine exhaust section 36. In the disclosed example, the first airflow 62 and the second airflow 64 have different associated air pressures and temperatures. For example, the first airflow 62 has a first temperature and a first pressure, and the second airflow 64 has a second temperature that is less than the first temperature and a second pressure that is less than the first pressure. The difference in temperature and pressure may be controlled using the fans 14a and 14b, such as by controlling fan speed of each fan 14a and 14b.

The first airflow 62 and the second airflow 64 stream over the heat pipes 56 of the heat exchanger 54. The heat pipes 56 transfer heat from the first airflow 62 to the second airflow 64 to thereby cool the first airflow 62. The cooled first airflow 62 is then discharged through the outlet 42 to cool the divergent section 40 of the engine exhaust section 36.

In the illustrated example, the obstruction caused by the heat pipes 56 within the first bypass passage 39a causes a natural pressure loss of the first airflow 62. The pressure loss provides the benefit of reducing liner blow-off loads to the divergent section 40. In some instances, it may be possible to directly use the second airflow 64 for cooling; however, if the second pressure of the second airflow 64 is relatively low, it may not be suitable for direct cooling of the engine exhaust section 36, for example.

In the illustrated example, a portion of the first airflow 62 is also discharged through the outlet 44 to cool the convergent section 38. The second airflow 64 is discharged through the outlet 48 at the divergent section 40 to provide additional cooling of the divergent section 40.

The disclosed cooling arrangement 28 thereby utilizes the different temperature of the first and second airflows in the heat exchanger 54 to provide cooled air to the divergent section 40 of the engine exhaust section 36. Using air-to-air heat exchange in combination with the first and second bypass flows may provide the benefit of avoiding or eliminating heat exchangers that utilize somewhat more complex circulatory coolant systems. Additionally, the added cooling provided by the "cooled" first airflow 62 may permit the use of other materials within the engine exhaust section 36. For example, the additional cooling may allow the use of lighter weight or less expensive alloy or organic composite materials.

As will now be described, at least the second airflow source 34 need not be a bypass passage as in the previous example. FIG. 2 illustrates another example in which like components are represented with like reference numerals. In this example, a gas turbine engine 100 includes a second airflow source 134 having an external airflow scoop 102. The external airflow scoop 102 extends radially outwards from an outer perimeter 104 of the engine 100, such as on an outer cowl or nacelle. The external airflow scoop 102 is connected with a passage 106 that receives an inlet airflow 137 that flows around the outer perimeter 104.

In operation, the inlet air 137 flows into the inlet section 13 and around the outer perimeter 104 of the engine 100. The inlet section 13 divides the inlet air 137 into a core flow 60 and a first airflow 62, and the external airflow scoop 102 directs at least a portion of the inlet airflow 137 into the passage 106 as a second airflow 164 that then flows over the heat pipes 56 of the heat exchanger 54.

Similar to the example of FIG. 1, the first airflow 62 and the second airflow 164 have different associated air pressures and temperatures and stream over the heat pipes 56 of the heat exchanger 54 to subsequently cool the divergent section 40 of the engine exhaust section 36 as previously described.

FIG. 3 illustrates another example in which like components are represented with like reference numerals. In this example, a gas turbine engine 200 includes a second airflow source 234 having an auxiliary power unit 202. For example, the auxiliary power unit 202 may be used to provide compressed air to start the engine 200. In this regard, a passage 204a connects the auxiliary power unit 202 to the engine 200. A valve 206 is disposed within the passage 204a. The valve 206 is operative to direct flow through the passage 204a between the engine 200 and another passage 204b that is thermally connected with the heat exchanger 54.

In operation, the inlet air 237 flows into the inlet section 13, which divides the inlet air 237 into a core flow 60 and the first airflow 62. The auxiliary power unit 202 produces a second airflow 262 that flows through the passage 204a. When the valve 206 is in a first position, the second airflow 262 continues to flow through the passage 204a to the engine 200 for the starting function. However, when the valve 206 is moved to a second position, the second airflow 262 flows through the passage 204b and over the heat pipes 56 of the heat exchanger 54.

Similar to the example of FIG. 1, the first airflow 62 and the second airflow 264 have different associated air pressures and temperatures and stream over the heat pipes 56 of the heat exchanger 54 to subsequently cool the divergent section 40 of the engine exhaust section 36 as previously described.

Thus, as disclosed by the examples herein, the heat exchanger 54 may be used in combination with the first airflow 62 from the first airflow source 32 and a second airflow (e.g., 62, 162, and 262) from a second airflow source (e.g., 34, 134, and 234) to cool the divergent section 40 of the engine exhaust section 36, or even other sections of an engine. As can be appreciated, the source of the second airflow is not limited to any particular source and may be any airflow from any airflow source that is relatively cooler than the first airflow 60.

Figure 4:
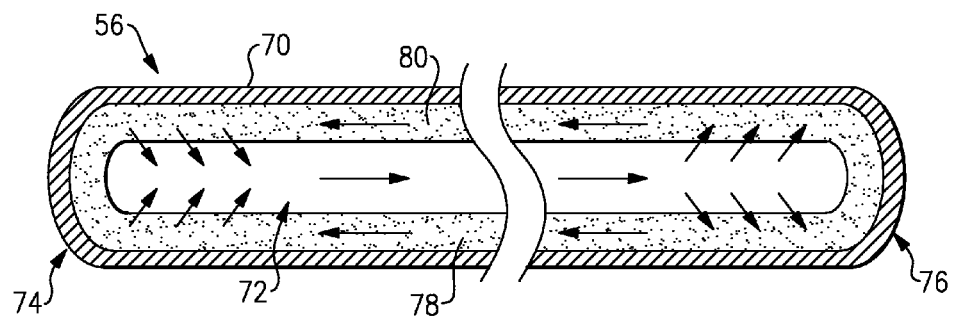
FIG. 4 illustrates an example of one of the heat pipes.

FIG. 4 illustrates an example of one of the heat pipes 56. In this example, the heat pipe 56 includes a sealed hollow tube 70 that contains a coolant 72, such as water, ethylene glycol, methane, liquid sodium, or other suitable coolant. The heat pipe 56 includes a first end 74 that is thermally connected with the first bypass passage 32, and a second end 76 that is thermally connected with the second bypass passage 34. The interior of the heat pipe 56 defines a cooling circuit 78 for transporting the coolant 72 in an evaporated and liquid state. In the disclosed example, the heat pipe 56 includes a porous material 80 that facilitates transport of the coolant 72, such as by using capillary forces.

Operationally, the coolant 72 transfers heat from the warmer first bypass flow 62 at the first end 74 to the relatively cooler second bypass flow 64 at the second end 76. The coolant absorbs heat from the first bypass flow 62 and evaporates into vapor. The evaporated coolant 72 then moves through the open central portion of the heat pipe 56 toward the second end 76. At the second end 76, the second bypass flow 64 cools the evaporated coolant 72 and condenses it into a liquid, thereby rejecting the heat into the second bypass flow 64. The porous material 80 then transports the condensed coolant 72 using capillary forces toward the first end 74 for another cooling cycle. In this manner, the coolant transfers the heat from the warmer first bypass flow 62 to the second bypass flow 64. Additionally, the heat pipe 56 provides the benefit of passive heat transfer. That is, the heat exchanger 54 operates without mechanical assistance, such as without a mechanical pump or the like.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A turbine engine cooling arrangement comprising:
   a core passage for receiving a core flow for combustion;
   a first airflow source including a first passage adjacent the core passage for conveying a first airflow;
   a second airflow source including a second passage adjacent the first passage for conveying a second airflow; and
   a heat exchanger that is thermally connected with the first passage and the second passage for transferring heat between the first airflow and the second airflow, wherein the entire first passage is located radially outwards of the core passage, and the entire second passage is located radially outwards of the first passage, relative to the core flow.

2. A gas turbine engine cooling arrangement comprising:
   a core passage for receiving a core flow for combustion;
   a first airflow source including a first passage adjacent the core passage for conveying a first airflow;
   a second airflow source including a second passage adjacent the first passage for conveying a second airflow; and
   a heat exchanger that is thermally connected with the first passage and the second passage for transferring heat between the first airflow and the second airflow, wherein the first passage includes a first outlet located at a first exhaust section position and the second passage includes a second outlet located at a second exhaust section position that is axially aft of the first exhaust section position relative to the core flow.

3. The arrangement as recited in claim 2, wherein the first exhaust section position and the second exhaust section position are located at a divergent section of an engine exhaust.

4. The arrangement as recited in claim 3, wherein the first passage includes another outlet located axially forward of the first outlet.

5. The arrangement as recited in claim 4, wherein the outlet that is located axially forward of the first outlet is located at a convergent section of the engine exhaust.

6. A gas turbine engine cooling arrangement comprising:
   a core passage for receiving a core flow for combustion;
   a first airflow source including a first passage adjacent the core passage for conveying a first airflow;
   a second airflow source including a second passage adjacent the first passage for conveying a second airflow; and
   a heat exchanger that is thermally connected with the first passage and the second passage for transferring heat between the first airflow and the second airflow, wherein the first airflow source comprises a bypass passage, and the second airflow source comprises a ram air scoop.

7. A gas turbine engine cooling arrangement comprising:
   a core passage for receiving a core flow for combustion;
   a first airflow source including a first passage adjacent the core passage for conveying a first airflow;
   a second airflow source including a second passage adjacent the first passage for conveying a second airflow; and
   a heat exchanger that is thermally connected with the first passage and the second passage for transferring heat between the first airflow and the second airflow,
   wherein the first airflow source comprises a bypass passage, and the second airflow source comprises an auxiliary power unit.

8. A turbine engine comprising:
   a core passage including a combustion section and a turbine section for receiving a core flow for combustion;
   an engine inlet section for dividing inlet air into the core flow, a first bypass flow, and a second bypass flow;
   a first bypass passage that is radially outwards of the core passage for receiving the first bypass flow;
   a second bypass passage radially outwards of the first bypass passage for receiving the second bypass flow;
   an exhaust for receiving the core flow, the exhaust having a convergent section and a divergent section located aft of the convergent section; and
   a heat exchanger that is thermally connected with the first bypass passage and the second bypass passage for transferring heat between the first bypass flow and the second bypass flow,
   wherein the first bypass passage includes a first outlet and the second bypass passage includes a second outlet, wherein the first outlet is located at the convergent section and the second outlet is located at the divergent section.

* * * * *